B. P. CRANDALL, dec'd.,

Assignor, by mesne assignments, to PROVIDENCE TOOL Co.

Velocipede.

No. 9,096. Reissued Feb. 24, 1880.

WITNESSES.

Wilmarth H. Thurston.

J. Knight

INVENTOR.

Providence Tool Co.
by John B. Anthony Prest.
assignee by mesne
assignment of Benjamin
P. Crandall deceased.

N. PETERS, PHOTO-LITHOGRAPHER, WASHINGTON, D. C.

UNITED STATES PATENT OFFICE.

PROVIDENCE TOOL COMPANY, OF PROVIDENCE, RHODE ISLAND, ASSIGNEE, BY MESNE ASSIGNMENTS, OF BENJAMIN P. CRANDALL, DECEASED.

VELOCIPEDE.

SPECIFICATION forming part of Reissued Letters Patent No. 9,096, dated February 24, 1880.

Original No. 79,553, dated July 7, 1868; Reissue No. 3,207, dated November 24, 1868. Application for reissue filed December 12, 1879.

*To all whom it may concern:*

Be it known that BENJAMIN P. CRANDALL, of the city, county, and State of New York, did invent certain new and useful Improvements in Velocipedes; and it is hereby declared that the following is a clear and exact description of the nature thereof, sufficient to enable others skilled in the art to which the invention appertains to fully understand and use the same, reference being had to the accompanying drawings, making part of this specification, in which—

Figure 1:
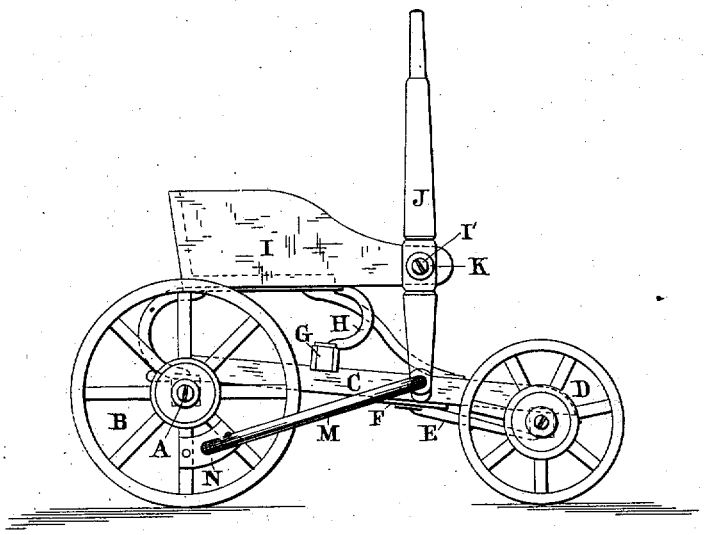
Figure 2:
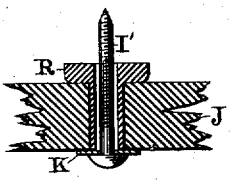
Figure 3:
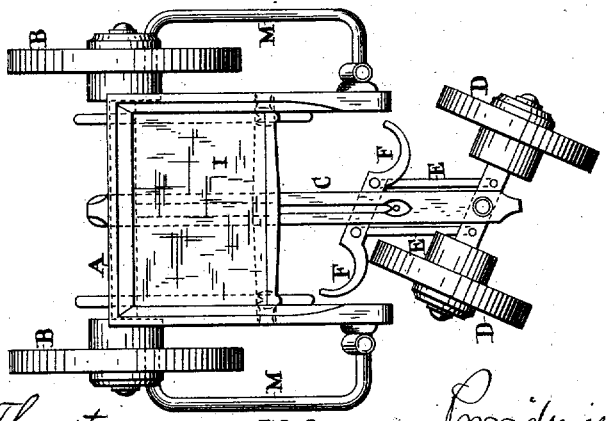
Figure 4:
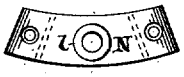
Figure 5:
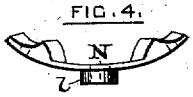

Figure 1 is a side elevation of the velocipede. Figs. 2, 4, and 5 are views of detached parts. Fig. 3 is a plan view.

Similar letters of reference indicate corresponding parts in the several figures.

The invention consists in certain improvements in velocipedes, as will be hereinafter more fully described.

In the drawings, A represents the axles, on which are mounted the driving-wheels B.

C is a pole or reach, whose rear end is secured to the axle A. Its forward end is pivoted to a short axle, on which are mounted the steering-wheels D. At a proper point of the pole C there is pivoted a yoke, F, which consists of a suitable piece of metal or wood projecting from both sides of the pole, so as to allow the feet of the rider to rest thereon and move the yoke as will be necessary relative to the position the steering-wheels D are to assume. The yoke and axle of the said wheels are connected together by rods or bars E, which are pivoted to the yoke and axle, either crossing or parallel to each other. By these rods or bars the yoke is within convenient reach of the rider, and allow the steering-wheels to be placed sufficiently far in front of them so as to operate the steering apparatus in a very easy manner and cause the turning of the velocipede without loss of power.

The seat I is mounted through the medium of the axle A and springs H, which are secured to a bar, G, resting upon the pole C.

The operating levers or handles J are constructed as ordinarily, and are pivoted to the pitmen or connecting-rods M, for communicating power to the driving-wheels B.

The levers or handles J have their bearings in tubular supports K. Each support consists of a hollow cylinder of length equal to the transverse thickness of the levers, and has at one end a flange, R, by which the support is secured to the seat I, whose sides should project sufficiently beyond the seat proper for this purpose.

An opening is made in the lever, so that it may be hung on the support and have its bearing thereby. A screw or fulcrum-pin, I′, is now introduced transversely into the support, and screwed into the seat I, a washer being beforehand interposed between the outer end of the support and the head of the screw. The lever therefore has a free and steady movement, and is not subjected to the ordinary wearing or rubbing actions, which always result when the holding-screw is passed directly through the lever.

The connecting-rods M have their front and rear ends bent at right angles, thereby forming crank-pins to admit of their being directly connected to the driving-wheels and to the operating-levers. Each connecting-rod is attached to the wheel which it drives by means of a plate, N, Figs. 4 and 5. This plate is of a proper form to cover two or more spokes, to which it is secured by screws or other fastenings, and it contains a hub or bearing, *l*, for receiving the wrist-pin end of the connecting-rod. The plate serves to distribute the strain among the spokes to which it is attached, while the hub or bearing which it affords for the bent end of the connecting-rod, from the circumstance that it is located parallel with the axle-bearing, and so that it will be intersected by a plane passing transversely through the the axle-bearing of the driving-wheel, enables the power, when applied through the levers to work the wheels, to be exerted more effectively and with less tendency to cramp the axle-bearings than would be the result in case the wrist-pin were not a part of the connecting-rod, but projected perpendicularly to the plane of the wheel and entered a bearing formed in the connecting-rod.

The plates are complete in themselves, ready to be applied to the spokes of the wheel, and may be removed when necessary, and others substituted.

In the old mode of making velocipedes one of the spokes was required to be enlarged to form a sufficient base for the attachment of the crank-pin. In this invention all the spokes are alike and of the same size, and the plate N can be applied to any two or more of them.

Motion is readily imparted to the driving-wheels, through the connecting-rods M, by working the handles of the operating-levers to and fro in the usual manner.

The tubular supports to receive the handles add greatly to the strength of the apparatus, while the vehicle is more easily and directly guided and operated by means of the yoke and connections than by any other mode now in use.

The construction of the machine, as above described, renders it much more durable and easy of operation than the ordinary velocipedes now in use.

Having thus described the invention, what is claimed as new, and desired to be secured by Letters Patent, is—

1. The combination, with the operating-lever J, of a tubular support, K R, and the independent screw I′, substantially as described.

2. As an improvement in the mode of operating the steering apparatus of velocipedes, the pivoted rods E, in combination with the yoke F and the steering-wheel D, substantially as described.

3. As a new article of manufacture, the detachable cast metallic plates N, when applied to the spokes of the wheels for the purpose described.

4. The combination, with the connecting-rod and wrist or crank pin rigidly attached thereto, of a hub or bearing for receiving said pin, fixed to the driving-wheel and arranged so that a plane passing through such crank-pin bearing will also intersect the axle-bearing of the driving-wheel, substantially as described.

5. The combination of the operating-levers, the connecting-rods, bent at both ends, as described, and the driving-wheels, having bearings for the crank-pin ends, arranged substantially as set forth.

PROVIDENCE TOOL COMPANY,
By JOHN B. ANTHONY, *President*,
*Assignee, by mesne assignments, of Benjamin P. Crandall, deceased.*

Witnesses:
WILMARTH H. THURSTON,
I. KNIGHT.